Oct. 27, 1964     C. C. ROECKS ETAL     3,154,005
FOOD BROILING OVEN
Filed March 8, 1962                             2 Sheets-Sheet 1
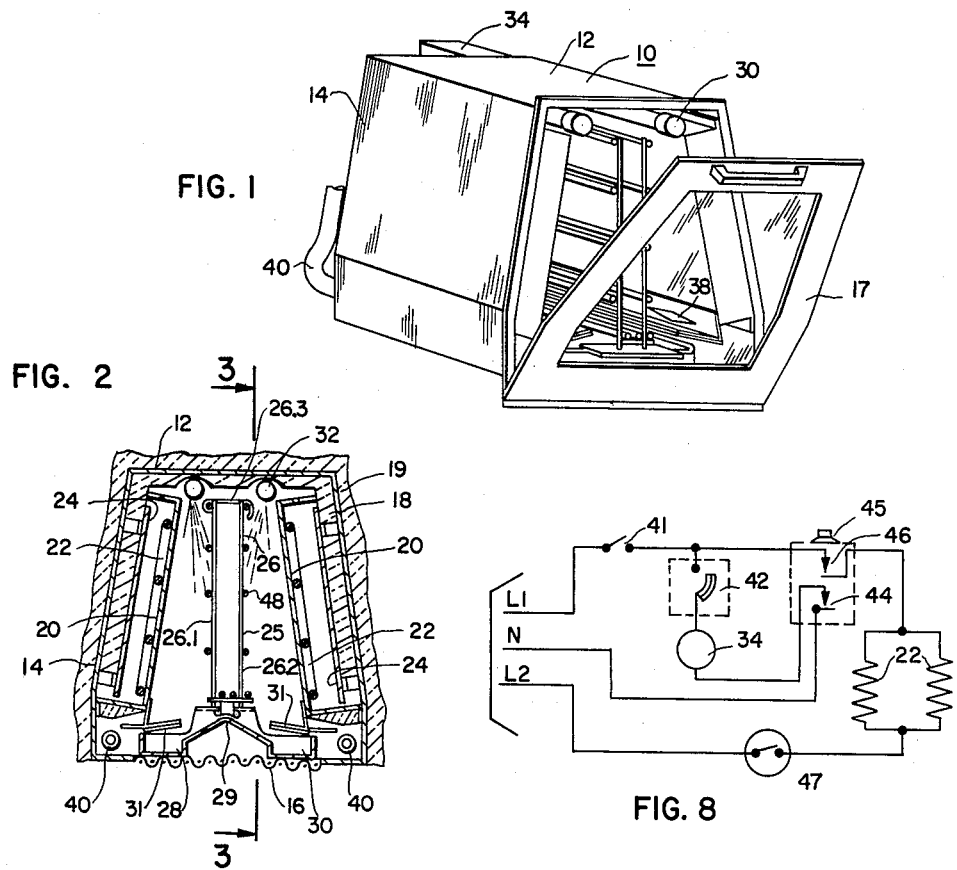
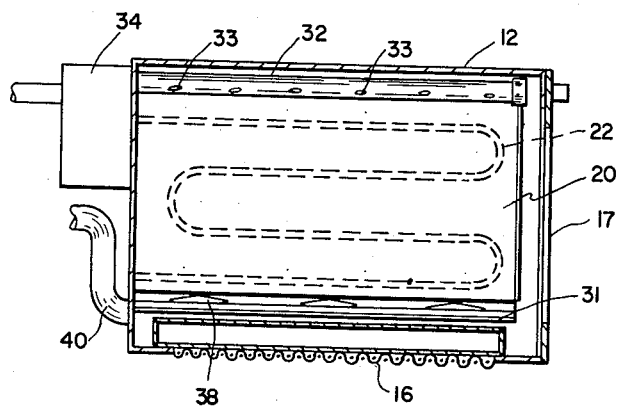
INVENTORS
CARL C. ROECKS
MYRON SWETLITZ
Marvin M. Chaban
ATTORNEY Oct. 27, 1964     C. C. ROECKS ETAL     3,154,005
FOOD BROILING OVEN
Filed March 8, 1962     2 Sheets-Sheet 2
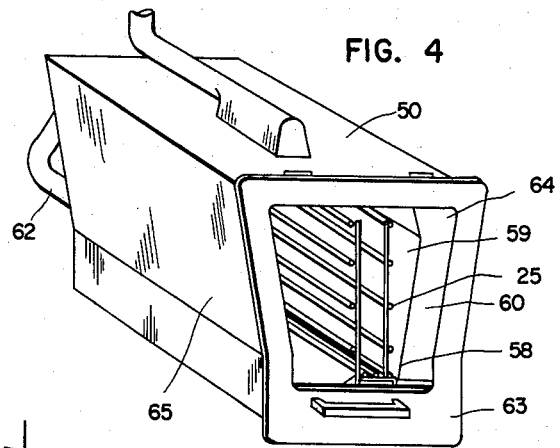
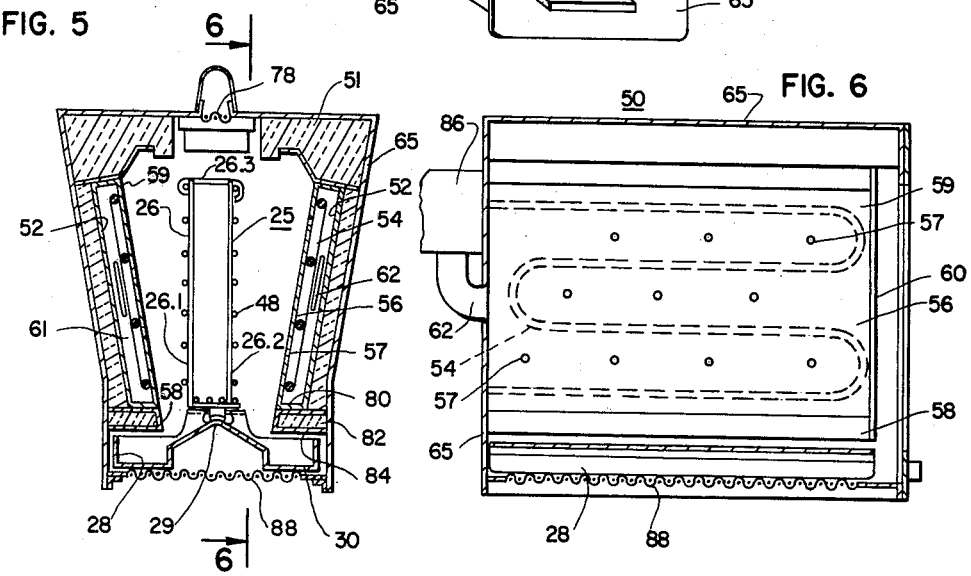
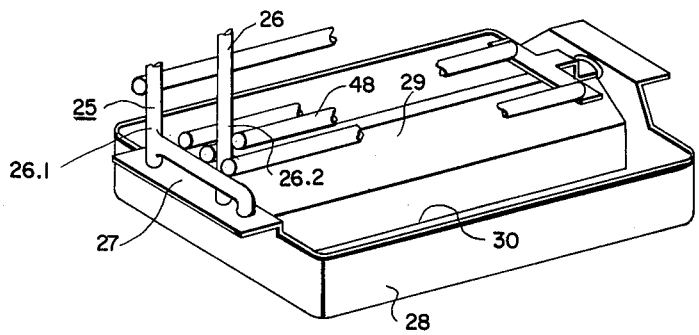
INVENTOR.
CARL C. ROECKS
MYRON SWETLITZ
ATTORNEY

3,154,005
FOOD BROILING OVEN
Carl C. Roecks, Phoenix, Ariz., and Myron Swetlitz, Skokie, Ill., assignors to General Electric Company, a corporation of New York
Filed Mar. 8, 1962, Ser. No. 178,402
5 Claims. (Cl. 99—389)

The present invention relates to broiling ovens and more particularly to a new type of broiling oven which utilizes a high velocity forced air flow to direct the heat from one or more electric heat sources against the food being broiled to effect the broiling operation.

In devising the present invention, it was found that when a high velocity, low volume jet of cool air is introduced into a heated area of considerable volume, the cool air jet immediately heats up and tends to drive before it at a high velocity an air stream at an elevated temperature. Thus, comparatively stagnant hot air is easily transformed by the high velocity, low volume air jets into directed hot air blasts thereby enhancing the heating effect of the air and the heated air can be directed at specific surfaces to be heated. To effect food broiling, quiescent heated air is propagated by the high velocity air jets to effect a rapid, high temperature surface searing action along surfaces being broiled. The food surfaces are subjected to high velocity, high temperature, short-wave length energy ideal for broiling by searing the surface at temperatures sufficient to brown the surface fats on the food without roasting the meat throughout.

It is therefore, an object of the invention to expose the surface of food to be broiled to a low temperature panel heat source and to direct the heat from the source at the food surface by means of high velocity directed jets of air to effect rapid browning and broiling of the food surface.

It is a further object of the invention to provide a vertical broiler rack for holding food to be broiled, and to provide panel heating sources angled obliquely from the rack to form acute dihedral angles between the broiling surfaces of the food and the respective heat panels, wherein the air heated by the panels is propogated by blasts of forced draft air into broiling contact with the surfaces being broiled, and thereafter the heated air is recirculated about by the obliquely disposed panels.

It is a still further object of the invention to provide a broiling device which utilizes directed blasts of heated air as the broiling media to produce evenly broiled food in a minimum amount of time and with a minimum of smoke and spatter.

It is another object of the present invention to provide means for broiling food by exposing the major surfaces of the meat to low temperature heat panels simultaneously, and where the temperature of the panels does not rise above 1,000° F.; to provide a forced air flow to direct hot air from adjacent the panels toward and against the food being broiled; and thereby to produce the desired seared or broiled surfaces in a comparatively short time with low temperatures at the food surfaces.

It is still another object of the invention to provide a broiler utilizing a heat surface adjacent the meat being broiled and a high velocity source of air directed at the meat in a manner tending to divert away from the heat source the hot greases blown off the meat surfaces.

It is also another object of the invention to provide an improved broiler in which the distance from the heat source to the meat surfaces is retained relatively constant for all meat thicknesses and utilizes a low temperature source whose intensity is varied to allow for differences in meat thickness.

In electric broiling, it has been the practice in the past to utilize as a heat source one or more electrical resistance heaters positioned adjacent the surface or surfaces to be broiled, to heat the source to incandescence at temperatures on the order of 1,500–1,600° F. or more and thereby to radiate heat from the source directly against the surface or surfaces being broiled. During broiling, the surface of the meat is seared by the high temperature radiant energy. If only one meat surface is exposed at a time, then the meat must be turned over to broil the other surface. If both surfaces are broiled simultaneously by being held vertically between two radiant heat sources, then the lower portions of the surface take on a washed-out appearance. In such broilers, where the heat source is equidistant from all portions of a surface, it has been found that grease droplets and other juices released by the surface searing process tend to roll down the surface, cooling the surface traversed and washing away any broiling effect imparted to the lower portions of the surface. The end product tends to be irregularly browned and very uneven in appearance.

To alleviate these problems and to effect the stated objects, the present invention utilizes in a broiler, a vertical broiler rack suitable for supporting such foods as steak, chops, hamburger, or the like. The rack is interposed midway between two obliquely mounted surface or panel heaters so that the food surfaces to be broiled are symmetrically positioned between the heaters. The heaters are heated conductively by a source of radiant energy which is shielded by the panels from radiating heat toward the meat surfaces. The heat panels at all times are maintained at a temperature lower than incandescence to reduce to a minimum the radiant energy received by the meat. By minimizing the radiant effects on the meat, the temperatures in the broiler and the overall broiling effect can be more closely controlled.

In a first embodiment of the invention, there is provided an inlet air conduit mounted above each of the heat panels with each conduit parallel to the meat surface. Each conduit includes a series of spaced air nozzles directed at the surface of the food being broiled. These nozzles provide a continuous discharge of air which is ejected at a high velocity to propagate the heat generated by the panels into a continuing series of hot air blasts directed at the food surfaces being broiled. Further, these nozzles are directed toward the meat surfaces in a manner which tends to drive hot fats and grease away from contact with the heating panel surfaces. By obliquely canting the heated panels with respect to the meat surfaces and directing the air blasts obliquely against the meat surfaces, the combined effect is to drive escaping greases away from the heat source panels. The fats are thereby prevented from combusting to form smoke and unfavorable cooking odors. This smoke inhibiting design may eliminate the need for exhaust filtering devices such as charcoal filters or catalytic screens. Such filtering devices, if desired, could be installed in the exhaust duct entrances in a conventional manner.

In the present system, the panel may be maintained at a temperature slightly less than 1,000° F. to generate air blasts of approximately 500° F. which in turn may raise the surface temperature of meat being broiled slightly over 200° F. At these temperatures which are considerably lower than those normally encountered in broiling, the temperatures at the meat surface (200° F.) are maintained at a lower level than the smoke point temperature of animal fats which is usually considered to be about 360° F., and considerably lower than the flash point temperature for animal greases which is considered to be about 570° F.

In this first embodiment, the panel heaters are canted with respect to one another from a comparatively wide opening at the lower portion of the broiler to a comparatively narrow opening adjacent the broiler top. At the foot of each of the heat panels there is cantilevered inwardly a baffle plate angled upwardly at an acute angle from the horizontal to terminate adjacent the lower end of the broiler rack. These baffle plates serve to concentrate and redirect the emitted heat toward the lower sections of a food surface being broiled. Above and parallel to each heat panel are the air inlet conduits with their spaced nozzles directed at the meat surface. A high velocity air source feeds the conduits with air for ejection toward the meat. Air ejected from the nozzles drives before it heated air which generally covers the upper half of the surface being broiled. In addition, the panel heat source is closer to the upper sections of the meat surface and tends to aid in the heating of this portion of the surface. The heated air currents in the broiling area tend to strike and rebound off the meat surface and tend to ricochet off the baffles and recirculate against the lower portions of the meat. Heavy greases and fats liberated from the meat will be driven by the air blasts toward the grease tray and the baffles and most specifically, away from the heated panel surfaces. By this combination of panels, baffles and air blasts, the entire meat surface will receive the high velocity, heated air currents in approximately an even proportion. The angled cantilever baffles also serve to deflect the directed hot air blasts away from grease drippings which are accumulated in a suitable tray resting on the broiler floor. By diverting away the hot air blasts, the grease drippings are maintained in a fairly cool condition below the smoke point and the flash point of grease. In this way, the smoke generated is minimized as is the fire hazard.

In a second embodiment of the invention, there is provided a broiler which includes a vertical broiling rack for supporting food to be broiled; the rack is positioned midway between two panel heating sources which are angled outwardly and upwardly on either side of the rack. Each panel is perforated at intervals and includes one or more serpentine heating units secured to the panel on the side remote from the food being broiled. When the heating units are energized, heat is transmitted by conduction from each of the units to the adjacent panel which may heat up to almost 1,000° F. High velocity jets of air are directed past the heating units and through the perforations in the panels for direct impingement of the heated air against the food being broiled to effect a rapid broiling of the food with comparatively low panel temperatures and meat surface temperatures. Again, means are provided for directing liberated fats from movement toward the heat panels and further means are provided for shielding the underpositioned grease tray from these heated air blasts.

In both embodiments, an added concentration of heated air has been directed to lower portions of the surface being broiled to counteract the tendency of the lower portions of the meat to assume the washed-out appearance. In the first embodiment, the oblique baffles become secondary low temperature heat radiators adjacent the lower portion of the surface and further these baffles tend to redirect and recirculate heated air currents both to the oblique panels for recirculation and directly to the meat surface. In the second embodiment, the oblique heat panels are closely adjacent the lower portion of the meat. By mounting the panel walls obliquely so that the lower portions of the heat panels are adjacent the lower portions of the meat surface, added heat and heated blasts are brought to bear on this lower half of the meat surface being broiled.

Having now briefly described the invention, the specifications of the invention both as to its organization and principle of operation, together with further objects and advantages, will best be understood by reference to the following specification taken in conjunction with the accompanying drawings in which:

FIG. 1 shows a front view in perspective of a broiler using the first embodiment;

FIG. 2 is a front sectional view of the embodiment of FIG. 1;

FIG. 3 is a side sectional view of the embodiment of FIG. 1 taken along line 3—3 of FIG. 2;

FIG. 4 is a front perspective view of an alternate embodiment of the invention;

FIG. 5 is a front sectional view of the embodiment of FIG. 4;

FIG. 6 is a side sectional view of the alternate embodiment taken along line 6—6 of FIG. 5;

FIG. 7 is a perspective partial view of the combined drip pan and broiler rack as used in both embodiments; and FIG. 8 is a schematic circuit drawing as used in both exemplified embodiments.

Now viewing FIGS. 1 and 2, there can be seen a first embodiment of the invention which comprises an enclosure 10, generally trapezoidal in cross-section with sheet metal top wall 12, downwardly and outwardly tapered sidewalls 14. The enclosure structure is completed by a screen or otherwise perforate floor 16 and a bottom hinged door 17. Door 17 may include glass central area to render the broiler compartment visible to the user. Within the enclosure food such as steaks, chops and the like may be broiled. Enclosure 10 may be used as a self-contained unit for broiling or may be adapted to fit within the cavity of a conventional oven range to perform broiling therein. In either event, within the enclosure 10 there may be provided a layer of insulation 18 for maintaining the enclosure at a comparatively low temperature.

An added layer 19 of insulation may be added (as shown in FIG. 2) to space the enclosure from the outer shell (not shown) of the self-contained unit or from the walls of an oven compartment. A broiling compartment is defined within the enclosure by opposed side panels 20, each canted inwardly from a comparatively wide opening at the base to a narrower opening at the top. Mounted to each side panel on the side remote from the broiling area and in surface heat transfer relation with each side panel 20 is a heat source which includes a resistance heating element 22 of the sheathed type. The sheath is configured in a known fashion in serpentine shape with a plurality of parallel straight run portions to generate heat over a wide heat area. Interposed between each heating element and the inner insulating layer 18 is a sheet metal reflector 24 with a polished metal surface adjacent the heating element to reflect emitted heat back past the heating element to multiply the heat effect and to direct the heat against the panel 20. The heated side panels 20 act as surface radiators of low temperature intensity adjacent the food being broiled. Each radiating surface should include a dark heat absorptive plate surface facing the heater and reflector in order that a maximum amount of the generated and reflected heat is effectively utilized.

In the center space between the heated panels 20 there is positioned a vertical broiler rack 25 of generally known metallic grid construction. The rack includes a pair of parallel, spaced, vertically extending skeletal frame members 26. One frame member 26.1 is mounted within apertures in the lip edges 27 of a grease tray 28 which stands within the enclosure below the broiling area. The other frame member 26.2 rests within grids of member 26.1 and the rack is further held together by pivoted top brace 26.3 which is secured to frame member 26.1 and hooks about the top of member 26.2 as shown in FIG. 2. The tray shown includes a raised center section 29 and two spaced-apart grease retaining sections 30. The raised center section 29 is sized to fit within the broiler compartment below the rack area with the grease retaining sections shielded from the broiling area by the baffle plates 31 extending inwardly and upwardly from the broiler panel lower ends as will be explained more fully.

Positioned above each radiator panel 20 in the area between the panel 20 and the vertical broiler rack 25 is an air inlet conduit 32 horizontally overlying the entire rack length. Each conduit is apertured at spaced intervals to provide a series of openings or nozzles 33 which are directed to discharge air to impinge on the rack approximately three fourths of the way down the rack. These openings may be ⅛″ in diameter and in tests it has been found that satisfactory broiling has been accomplished with six or more nozzle openings per conduit. These conduits are sealed at the front end, and at the rear end are connected in multiple to the outlet of a blower 34. Blower 34 is positioned between the conduits physically at the rear of enclosure 10. The blower draws air from the ambient surroundings and transmits its output to the twin conduits 32. Blower 34 is directly motor-driven by a fractional horsepower motor to produce a high velocity, low volume of air to the twin conduits 32. This blower may exemplarily be of the type which rotates at 12.000 r.p.m. to produce 5 cubic feet per minute at 1.7 inches of water static pressure. A blower such as this will produce air at a velocity upwards of 1,000 feet per minute for transmission through the conduits and ejection from nozzles 33, which as mentioned should total twelve or more nozzles per broiler.

Completing the description of the broiler construction, there are provided a pair of baffle plates 31 each secured at one end to the bottom of the radiator panel 20, each cantilevered from the panel mounting and inclined slightly upwardly from the horizontal to terminate adjacent the broiler rack. These plates 31 are constructed of sheet metal and serve to cover and shield virtually all of the grease retaining sections 30 of the pan 28 from the effects of the radiant energy emitted by the radiator plate 20 and also to divert the circulating hot air blasts from nozzles 33 from reaching the grease tray 28. With the slight inclination of the baffle plates, air jets from the conduit will strike the meat being broiled and will rebound sufficiently to strike the baffle plates and to recirculate upwardly against the radiator plate. By the use of these baffle plates, the heated air streams are diverted from the grease pan and recirculated. The grease pan is shielded from the extreme heat in the broiler area by this construction. Also, these baffles may aid in the broiling when fat globules spatter from the meat. These fat globules will frequently be trapped on the baffles and burned thereon by the high temperature air striking the baffles and as a result creating a charcoaling effect. As mentioned, the baffles by their oblique positioning tend to aid in the recirculation of heated air through the broiler area. The baffles may be slotted near the cantilever mounting with matching passages through the insulation layer to provide a series of spaced passageways 38 for the exhaust of heated gases from the broiling compartment to a suitable exhaust conduit 40. The exhaust conduit 40 may channel these exhaust gases to the building exterior or to suitable heat transfer media, in a generally known manner. Preferably, the exhausting of heated gas may utilize a motor-driven exhaust fan or blower (not shown) of any known type to remove the gases from the broiler environs. Care must be taken however to shield the exhaust fan or blower motor from contact with the relatively high temperature of the heated air being exhausted.

FIG. 8 shows a simple schematic circuit for energizing my broiling unit. The circuit includes a conventional 230-volt, 3-wire Edison A.C. source with leads L1, L2 and N. In known manner leads L1 and L2 provide 230 volts for the heaters and connection across leads L1 and N provide 115 volts for the blower motor. Connected to lead L1 is a door switch 41 which acts as a line switch and opens the circuit on opening of the door. From the door switch a first path may be traced to bi-metal contact set 42. This contact set with its armature contact of dissimilar metals is physically placed adjacent heaters 22 or at least near panels 20. Because of this proximate positioning the contacts of set 42 will close after the panels have preheated to a predetermined bi-metal operating temperature. On closure, contacts 42 prepare the circuit to the motor of blower 34. This blower circuit may further be completed by a further set of contacts 44 which may be individually actuatable manually or may be actuated by rotation of knob 45. Knob 45 is a manually rotatable heat control knob which governs the actuation of temperature setting or heat intensity setting mechanism shown representatively as contacts 46 which may be the output contacts of a switch mechanism such as that shown in U.S. Patent 2,747,073, issued to S. B. Welch on May 22, 1956. The switch shown in this patent is infinitely variable from an off position through sequentially increasing heat output positions to a position providing high heat suitable for broiling. As applied to the present invention, the switch contacts 46 would provide infinite variability over a range limited to the temperatures which may be employed for broiling foods of assorted thicknesses. This contact set controls the circuit closure to the heaters 22 which in turn are connected to lead L2, the other side of the 230-volt line through safety thermostat 47. Thermostat 47 is normally closed and only opens the heater circuit on excessive temperatures at the heating panels. Optimally, thermostat 47 may be of the type which requires manual reset once opened, thereby acting as a conventional safety shut-off switch.

Now turning to the operation of the broiler embodied in FIGS. 1–3, the broiler control knob 45 is rotated to the heat desired and the door is closed. This knob movement closes contacts 44 and 46. The heaters 22 heat following closure of contacts 46 and after a time delay sufficient to allow the oven to preheat, contacts 42 close the circuit to the blower motor 34.1. As elements 22 warm up they tend to emit heat in all directions. Heat directed toward reflector panel 24 is re-radiated toward the heater and to radiator panel 20. This heat in addition to the heat conducted directly from the heater to the radiator panel causes the radiator panel to heat. After the radiator panel 20 has been brought up to temperature for a sufficient time, the heating unit will have heated toward its radiant emissivity at a temperature above 1,100° F. and panel 20 will approach 1,000° F. The radiator panel 20 at this temperature is well below the temperature at which incandescence occurs and panel emits heat convectively to the broiling area at this comparatively low temperature.

When the user has ascertained, by whatever suitable means are used, that the broiler has preheated to its operating temperature, the food which we will assume to be a steak, is placed within the parallel grids 26.1 and 26.2 of the vertical broiler rack 25, with the large meat surfaces exposed to the radiator panels 20. The rack and grease pan 28 are placed within the broiling compartment and the conventional front access door 17 is re-closed. By this time, through the operation of thermally sensitive time delay device 42, the motor of blower 34 is actuated following closure of door switch 41. The blower draws in air from the surroundings and generates a high velocity, low volume air flow to the parallel conduits 32. This air flow is ejected through nozzles 33 toward the broiler rack 25 and both surfaces of the meat being broiled. As the volume of air in the air flow is small compared to the volume of heated air in the broiling compartment, the air as it leaves the nozzle is instantly heated by the high temperature air in the compartment. It has been found that air substantially at room temperature as it leaves the nozzle attains a high temperature in but a fraction of an inch after expulsion from the nozzle. The resulting high temperature air flow is directed toward the steak surfaces with but little diminution in air velocity. In this manner, the resultant high temperature air is directed with high velocity obliquely against the parallel steak surfaces. The air stream is directed to strike the meat surfaces obliquely at a level approximately three fourths of the way down the length. These air streams will be acted upon by upward convective air currents from the heaters, resulting in the air streams striking the surfaces at many levels centering at about the mid-level of the surface being broiled. Further, a large proportion of the air will be diverted from the original path by the air currents reflected by the oblique side panels 20 and the inclined baffles 31. These reflected currents will also act on the air emitted by the nozzles resulting in heated air currents striking the steak surfaces both above and below the mid-level; consequently the entire surface will receive high velocity, high temperature air. The air striking the steak surfaces will rebound at a particular reflected angle dependent on the angle of incidence to the surface and will be deflected downwardly toward baffle plates 31. Greases and fats liberated by the heated blasts will be deflected downwardly with the rebounding air currents toward the grease tray and clearly away from the heat panels 20. The rebounding air may strike the baffle plate and some air escape through the exhaust openings 38 in baffles 31. Other air currents may strike the raised center section 29 of the grease tray 28 and will be diverted from the grease collecting in the tray. In any event, the heated air in the main will be diverted away from the grease retaining sections 30 of tray 28 and thereby cannot reach the grease tray and the grease retained therein. Other air currents rebounding upwardly from the baffles will recirculate past the radiator plate, will again strike the meat surface and in the main will be directed toward the air inlet conduits for continued recirculation and heating of incoming air.

A portion of the heated air (as mentioned) is continually drawn off through exhaust openings 38 in the baffles for flow out the exhaust conduit 40 apertured into each sidewall 14. These conduits may, as mentioned, have a suction induced therein by a suitable exhaust fan (not shown) to remove products of combustion from the broiler chamber. The exhausted air entering the exhaust conduit reaches the conduit by passage through slots 38 in the vertical extent of the baffle plate 31. By the use of this passage of exhausted air, pressure in the compartment is maintained at relatively atmospheric pressure. To further insure this maintenance of atmospheric pressure, the mesh flooring 16 of the compartment will tend to equalize pressures by providing communication with the ambient surroundings. This atmospheric pressure in the compartment safeguards the user from flash burns and the like on opening of the door 17.

Now turning to the embodiment of FIGS. 4–6, there is shown an enclosure 50, about which is suitable layer 51 of insulation may be applied. The enclosure may then be fitted within a suitable cabinet individually or may be fitted into a broiling compartment of a kitchen range or oven. As with the prior embodiment, the operation with either form of construction or housing remains identical.

In this embodiment as shown, spaced within enclosure 50 are polished sheet metal walls 52 which serve as reflectors for the serpentine sheathed heating element 54. These heating elements are supported by securement to the inner surface of the broiling panels 56. Broiler heat radiating panels 56 are perforated at openings 57. The perforations in these panels are dispersed about the area of the wall to cover the usual area of food standing in the vertical broiler. In each of the opposed panels 56 there may be ten or twelve openings 57 in total. Of these openings, a greater quantity are positioned toward the lower end of the panels to provide heat concentration at the lower end of the meat surface. These panels are canted obliquely in a symmetrical manner from a narrow opening at their lower end 58 to a wide opening at their upper end 59. These panels are affixed to the sidewalls 52 by end plates 60 which enclose the two heating areas or chambers 61. To complete the air-sealed construction of the chambers, there are provided respective horizontal metal walls 80, each of which extends from the adjacent panel 57 to the outer wall 65. A layer of insulation 82 and a suitable insulating backing plate 84 keep the area below walls 80 in comparatively cool condition. These walls and their intermediate insulation layer 82 tend to block currents of heated air from reaching the area below and will keep a large proportion of the conducted heat from reaching the area where grease drippings are retained. The chambers 61, so formed, are virtually air tight with air inlet at conduits 62 in the sidewalls 52 of the enclosure and air outlet through openings 57. To complete the construction of the enclosure, a top hinged door 63 with a central glass panel 64 may be used to allow access and visibility to the broiler compartment.

To provide a stream of high temperature air to food mounted in the rack, the suitable inlet conduits 62 from a blower are extended through enclosure walls 65 approximately midway up the sidewalls. These conduits are supplied with high velocity, low volume air flow by a motor-driven blower 86 which may be placed at the rear of the broiler compartment. The blower draws room temperature air from the ambient surroundings and converts the air to a high velocity air flow directed horizontally through the enclosure walls. The air flow through conduits 62 is ejected at high velocity into heating compartment 61 directed toward radiator panels 56. The air is heated and escapes at comparatively high temperature with comparatively high velocity through openings 57. Positioned at the top center of the broiler compartment is a slotted exhaust opening 78 which communicates with the broiler compartment for exhausting the hot grease laden gases resulting from the broiling operation through conduits to the exterior of the building housing the broiler or through suitable heat exchangers (not shown) for returning air to the kitchen.

To complete the construction generally, the floor 88 of the grease tray area below the broiler area may be fabricated of openwork mesh or the like. The floor supports the imperforate grease retaining tray 28 (which may be identical to that used in the first embodiment and shown in detail in FIG. 7) in a stable condition and allows air to enter or escape from the broiler compartment to maintain the compartment pressure substantially equal to that of the surrounding area. The reason for this expedient is quite obvious when one considers that without this form of pressure relief, the user opening the compartment door would most likely be greeted with a blast of extremely hot, high pressure gases which could cause severe burns to the user. Further to prevent such an occurrence the control circuit includes a door switch to shut off air flow immediately on opening of the door. For control of the second broiler embodiment a control circuit such as that shown in FIG. 8 would be employed in much the same manner as described for the prior embodiment.

The grease tray 28 includes the grease retaining sections 30 which are positioned below the insulated horizontally extending walls 80. By combining these walls 80 and the raised center section 29 of the grease tray 29, the grease retaining sections are blocked from receiving direct air blasts rebounding from the food surfaces. The insulation layer 82, of course, tends to keep the grease area isolated from the passage of conductive heat also, as generated by heat panels 56. Further, it can be seen that with nozzles 57 directed horizontally, rebounding air currents will tend to strike the upwardly sloped panels 56 in a manner further isolating the grease tray from these hot air blasts.

Now turning to the operation of the embodiment of FIGS. 4–6, the heating unit 54 should be energized to preheat the broiling compartment by control apparatus similar to that shown in FIG. 8 and soon the blower motor is energized prior to the introduction of a steak to be broiled in the vertical broiler. The broiler rack and the steak borne thereby are placed in the compartment and the blower motor is then re-energized following closure of the door. Cool air is drawn in from the ambient surroundings by the blower 86 and fed into the conduits on either side of the broiler. The air entering the conduits 62 is of high velocity and low volume and enters the enclosed heating chambers 61 for mixture with the heated air. The resulting heated air is ejected through the openings 57 in the radiator panels 56 in the form of high temperature, high velocity air jets directed against the surfaces of the steak in the broiler rack. More jets of heated air are directed at the lower portion of the steak and this combined with the greater proximity of the panel to the meat lower portion creates an intensity of heat at the lower end of the meat surface. By the proximate position of the panels at the lower portions of the meat, a concentration of high velocity air is directed at the lower end, the lower end is heat blasted sufficiently to counteract the "washing effect" encountered in food held vertically. By this "washing effect" is meant the effect by which the fats and greases liberated at the top of the surface being heated tend to flow down the surface under the influence of gravity. As these fats normally flow downwardly they cool and tend to wash out the broiled or browned appearance of the meat surface. By canting the radiator plate obliquely with the distance from radiator to meat surface small at the lower end, the intense effect of the heated air blasts directed at the lower end of the meat surface tends to carbonize the flowing fats and maintain a broiling or browning appearance uniformly along the surface being broiled. The upper portion of the steak also receives high temperature, high velocity directed jets to a slightly lesser degree. The upper section also receives the normal convection currents rising from the heated panels to aid in heating the meat upper portions.

By utilizing the principle of employing high velocity air currents directed against the meat surface, in conjunction with the canted panel heat sources it has been found that the grease and fats leaving the meat surfaces are borne by the rebounding air currents toward the grease tray and the lower portion only of the heat panels; greatly inhibiting creation of smoke.

Further, it has been found that by the use of high velocity air currents propagating the heated air in the manner described for either of the present embodiments, the broiling time of meats may be reduced considerably. It is hypothesized that the velocity of the heated air will drive the heat deeper in the surface ports than would otherwise be the case, so that the surface is browned more rapidly without overcooking the center of the meat being broiled.

While there has been described what are at present thought to be the preferred embodiments of the invention, it will be understood that it is our intent to cover in the appended claims all such modifications as fall within the true spirit and scope of the invention.

What is claimed is:

1. A broiling apparatus comprising:
   rigid elongated panels forming the sidewalls of a broiling chamber,
   a vertical broiling rack for holding food to be broiled midway between said panels with the food surfaces exposed to said panels,
   means on the side of said panels remote from said rack for heating said panels for radiation of heat energy toward said rack,
   blower means for generating a high speed air flow,
   a conduit disposed intermediate each said panel and said rack, each said conduit being near the top of its adjacent panel,
   a plurality of nozzles in each of said conduits for directing said high speed air flow through the heat pattern generated by said panels toward said food surfaces whereby a plurality of high speed, heated air streams impinge against the food in said rack to supplement said radiated heat energy in effecting a broiling operation on the food surfaces,
   said panels canted obliquely with respect to one another from a narrow gap adjacent the top of the broiler rack to a wide opening adjacent the bottom of the rack,
   deflecting baffles affixed to the bottom of said panels and extensive into the area adjacent the broiler rack for reflecting upwardly streams of heated air rebounding from said food surfaces,
   and exhaust openings in said baffles for exhausting air from the broiler compartment.

2. A broiling apparatus comprising:
   wall means defining an enclosed housing,
   rigid panels disposed inwardly of the side walls of said housing to provide side walls of a broiling chamber,
   means for heating said panels to a temperature of the order of 1,000° F. for radiation of heat energy interiorly of said broiling chamber while generating currents of heated air,
   a vertically disposed broiler rack within said broiling chamber for the support of foodstuffs to be broiled, said rack being arranged parallel to and centrally between said panels,
   means for discharging air into said chamber at a relatively high linear velocity, said means including conduits extending longitudinally above said rack at each side thereof and having nozzles directing said air angularly downwardly through said heated air currents and against each side of said broiler rack,
   said panels being arranged at an angle the apex of which is above said rack, the upper edge of each panel being below said conduits and relatively close to the upper portion of said rack and the lower edge of each panel being at a substantially greater spacing from the lower edge of said rack,
   and an air-deflecting baffle fixed to each said panel adjacent the lower edge thereof, each said baffle being the length of its associated panel and extending inwardly and upwardly toward the lower portion of said rack.

3. A broiling apparatus, comprising:
   upstanding panels forming the side walls of a broiling chamber,
   means including an imperforate gable structure and an open-topped gutter at each side thereof, said gable structure and gutters forming a bottom wall extending longitudinally of said chamber with the gable apex centrally between said panels and said gutters below said panels,
   means providing a vertically arranged open rack extending longitudinally within said chamber above said gable apex, said rack having side wall areas substantially equal to the projected area of the facing panel, whereby foodstuffs may be held within said rack with each of the major surfaces thereof openly facing a panel,
   means for heating said panels for emission of heat energy toward said foodstuff surfaces,
   means for directing a flow of heated air against said surfaces,
   and wall means extending transversely across each said gutter into relatively close proximity to the respective sides of the gable below the apex thereof to substantially shield said gutters against direct exposure to the elevated temperatures within said chamber while providing for entry into said gutters of grease dripping from said foodstuffs during the broiling thereof.

4. A broiling apparatus, comprising:
   upstanding panels forming the side walls of a broiling chamber,
   means including an imperforate gable structure and an open-topped gutter at each side thereof, said gable structure and associated gutters forming a bottom wall extending longitudinally of said chamber with the gable apex centrally between said panels and said gutters below said panels, means providing a vertically arranged open rack extending longitudinally within said chamber above said gable apex, whereby foodstuffs may be held within said rack with each of the opposite sides thereof openly facing a panel, means disposed behind said panels for heating said panels for emission of heat energy toward said foodstuff surfaces, means for directing a flow of heated air against said surfaces, and wall means above each said gutter to substantially shield said gutters against direct exposure to the elevated temperatures within said chamber, said wall means providing an elongated passage adjacent said gable structure for entry into said gutters of grease dripping from said foodstuffs during the broiling thereof.

5. A broiler for meat products, comprising:

an enclosure defining a broiling chamber, an upstanding electric panel heat source substantially coextensive with said chamber to radiate heat energy toward the center thereof while generating upwardly flowing convection currents of heated air, upstanding rack means for disposing a meat product openly facing said panel heat source to receive heat energy therefrom, said rack means and said panel heat source forming an acute angle, an air discharge conduit extending longitudinally of said panel and said rack means in the path of said convection currents and having a plurality of discharge ports directed angularly toward the upper side wall portion of said rack means, means for generating a high velocity flow of air through said convection currents for impingement of heated air against the surface of said meat product facing said panel heat source, the temperature of said air flow being such as to supplement said radiant heat energy in said broiling operation while maintaining the surface temperature of the meat product below the smoking temperature of juices and liquified fats, grease receiving means below said rack means and said panel heat source and extending coextensive therewith, and baffle means positioned intermediate said panel heat source and said grease receiving means for substantially shielding said juices and liquified fats from the directed heated air flow and for redirecting a substantial volume of said air flow toward said rack means and said panel heat source.

References Cited in the file of this patent
UNITED STATES PATENTS

| | | | |
|---|---|---|---|
| 1,762,176 | Kuhn et al. | June 10, | 1930 |
| 1,832,831 | Ginder | Nov. 17, | 1931 |
| 2,127,658 | Walterspiel | Aug. 23, | 1938 |
| 2,214,630 | Wheeler | Sept. 10, | 1940 |
| 2,912,922 | Schmall | Nov. 17, | 1959 |
| 2,931,352 | Edwards | Apr. 5, | 1960 |
| 3,003,409 | Mills | Oct. 10, | 1961 |